United States Patent [19]
Kaku et al.

[11] Patent Number: 4,622,564
[45] Date of Patent: Nov. 11, 1986

[54] OPTICAL INFORMATION RECORDING APPARATUS

[75] Inventors: Toshimitsu Kaku, Sagamihara; Takeshi Nakao, Kukubunji; Yoshito Tsunoda, Mitaka, all of Japan

[73] Assignee: Hitachi, Ltd., Tokyo, Japan

[21] Appl. No.: 681,690

[22] Filed: Dec. 14, 1984

[30] Foreign Application Priority Data

Dec. 14, 1983 [JP]  Japan ................................ 58-234250
Dec. 21, 1983 [JP]  Japan ................................ 58-239747

[51] Int. Cl.⁴ ........................ G01D 15/06; G01D 9/42
[52] U.S. Cl. .................................... 346/160; 346/108; 346/107 R
[58] Field of Search .................... 346/160, 107 R, 108, 346/76 R; 358/285, 296

[56] References Cited

U.S. PATENT DOCUMENTS

4,271,334  6/1981  Yardy ............................ 346/108 X
4,535,342  8/1985  Ohara et al. .................... 346/160 X Primary Examiner—E. A. Goldberg
Assistant Examiner—Linda M. Peco
Attorney, Agent, or Firm—Antonelli, Terry & Wands

[57] ABSTRACT

In an optical information recording apparatus in which a plurality of light beams are focused on a disc to form a write/read spot or an erase spot, the position of the light spots on a track of the disc is detected to control the distance between the light spots or the length of the light spots, so that even when the positions at which the light spots are formed differ in the radial direction of the disc, uniform and accurate write/read/erase of information can be effected irrespective of the light spot positions.

16 Claims, 8 Drawing Figures

OPTICAL INFORMATION RECORDING APPARATUS

BACKGROUND OF THE INVENTION

This invention relates to an optical information recording apparatus typically using two spots efficient for effectuation of an error check mode immediately after recording, and write/read/erase mode.

Conventionally, there have been proposed for use in optical discs a method for realizing an error check function immediately after recording or writing and a method for realizing a write/read/erase function, both the methods utilizing two spots. In the former method, a preceding write spot and a succeeding read or reproduction spot are located close to each other on the same track, and immediately after recording of data by the preceding write spot, the recorded data is read by the succeeding read spot to thereby effect the error check. The latter method is applied to an optical disc wherein a chalcogenide material is used and a laser beam is irradiated on the material to bring it into a crystalline state or an amorphous state so as to effect write/erase of information, in such a manner that a preceding circular read/write spot and a succeeding elliptical erase spot are located close to each other on the same track with a premise that the preceding read/write spot is irradiated in the form of a short-duration light pulse to rapidly heat and cool the material so as to bring it into the amorphous state and the succeeding erase spot is irradiated in the form of a relatively long-duration light pulse to gradually heat and cool the material so as to bring it into the crystalline state, thereby effecting a write/read/erase mode.

In both the methods, however, since the rotation speed of the disc is constant and the distance between the two spots is fixed, linear velocities are different at inner and outer peripheral positions on the disc and the time distance between the two spots becomes different for various positions on the disc. Accordingly, in the case of the error check mode, an error occurs which is due to a timing error for signal reproduction to thereby make the error check invalid and in the case of the write/read/erase mode, the position of a portion to be erased displaces. In particular, when erasing, because of the difference in linear velocity between inner and outer peripheral position on the disc, irradiation periods of time for the beam that erases one recorded pit differ at different positions on the disc, leading to discardant erasing conditions for the inner and outer peripheries on the disc. As a result, the recorded information cannot be erased uniformly and accurately throughout the entire surface of the disc.

SUMMARY OF THE INVENTION

This invention contemplates elimination of the above problems and has for its object to provide an optical information recording apparatus capable of effecting uniform and accurate write/read/erase operations throughout the entire surface of the disc.

To accomplish the above object, the present invention is featured in that a plurality of light beams are focused into a plurality of light spots for write, read or erase of information and the position of at least one of the plurality of light spots is detected in the radial direction of the disc, and on the basis of a detection result, the center position of the light spot is so controlled as to vary along the track. For example, where an acousto-optic (A/O) modulator is used to control the position of the light spot, the frequency component of an ultrasonic wave applied to the acousto-optic modulator is controlled on the basis of a position detection result of the light spot to thereby vary the deflection direction of the plurality of light beams and consequently control the center position of at least one of the plurality of light beams.

BRIEF DESCRIPTION OF THE DRAWINGS

The present invention will be apparent from the following detailed description taken in conjunction with the accomapnying drawings, in which.

DESCRIPTION OF THE PREFERRED EMBODIMENTS

Figure 1:
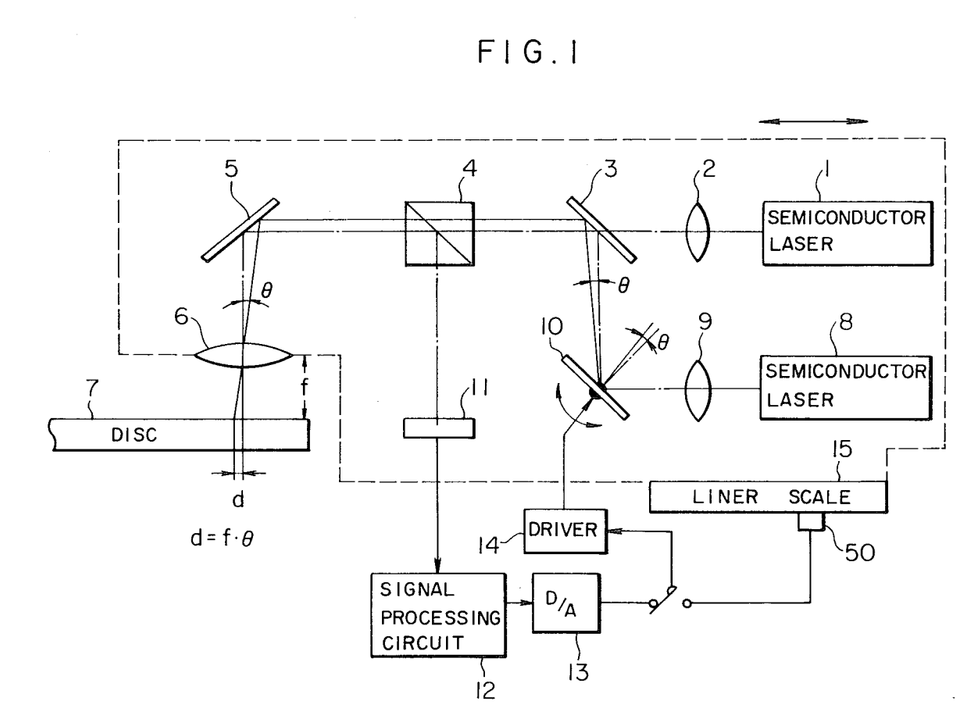
FIG. 1 is a block diagram showing an optical information recording apparatus according to a first embodiment of the invention.

FIG. 1 shows a first embodiment of the invention directed to the formation of two spots by using two laser light sources in the form of semiconductor lasers of different wavelengths. A first semiconductor laser 1 used for the formation of a write/read spot emits a light beam which is formed by a coupling lens 2 into a parallel beam. The parallel beam passes through a wavelength separation filter 3, a prism 4 and a corner mirror 5 and is focused by a focusing lens 6 into a small spot on the surface of a disc 7. For clarity of explanation, the corner mirror 5, focusing lens 6 and disc 7 are illustrated after being rotated through 90° with respect to the sheet of drawing, and an optical system illustrated in FIG. 1 uses a half prism as prism 4. A second semiconductor laser 8 used as a small output laser for reproduction (in the case of error check) or as a large output laser for erase (in the case of write/read/erase) has a wavelength different from that of the first semiconductor laser 1. A light beam emitted from the second semiconductor laser 8 passes through a coupling lens 9 and a galvanomirror 10 and is reflected at the wavelength separation filter 3. The reflected beam passes along almost the same optical path as that for the light beam from the first semiconductor laser and is focused into either a read spot or an erase spot on the disc in such a manner that the spot for read or erase is located close to the write/read spot on the same track. The distance on the disc, d, between the two spots is given by $d = f\theta$, where f is a focal length of the focusing lens 6 and $\theta$ is an angle between the optical paths for the first and second semiconductor lasers. For $f = 4.5$ nm and $d = 20$ μm, for instance, $\theta = 4.4$ mrad is obtained, indicating that the beam from the second semiconductor laser may be irradiated on the focusing lens 6 through the optical path for the second semiconductor laser 8 which is inclined by $\theta = 4.4$ mrad with respect to the optical path for the first semiconductor laser 1. The value of $\theta$ is determined by a rotation angle $\phi$ of the galvanomirror 10 is accordance with the relation of $\theta = 2\phi$ and hence, in the above example, $\phi = 2.2$ mrad stands. When considering write of information on the disc surface, read of the information and erase of the information, the fact that the time distance, t, corresponding to the geometrical distance $d = 20$ μm between the two spots varies with the revolution number, N, of the disc and the position, D (in terms of diameter), on the disc becomes a matter of significance. Specifically, since t is related to d, D and N by $t = d/(\pi \cdot D \cdot N)$, t differs at different positions D on the disc (hereinafter simply referred to as disc position D). The ID information such as track addresses and the recording data are written on the disc at time equidistances. Therefore, when the read or erase operation is effected with the geometrical distance d fixed, synchronization for the read signal used in the case of error check is disturbed owing to the varying t at different disc positions D, thus making the error check function invalid. Further, in the case of the erase mode, the timing for erase shifts and as a result, the position of a portion to be erased displaces. According to this embodiment, in order to keep constant the time distance between the two spots, the galvanomirror 10 is rotated by means of a linear scale which detects the track address indicative of the position of the light spot on the track or the position of the optical head. Reflecting flux of light from the surface of disc 7 caused by the write/read spot passes through the focusing lens 6 and corner mirror 5 and it branches at the prism 4 to a photodetector 11 at which it is converted into an electric signal which in turn is processed in a signal processing circuit 12 to provide a servo signal and an information signal. The track address demodulated by the signal processing circuit 12 is converted at a D/A converter 13 into an analog signal. This analog signal is applied to a driver 14 which effects an analog drive of the galvanomirror 10 for making constant the time distance between the two spots. When using a linear scale 15, an analog signal indicative of a position of the optical head is similarly detected by a detector 50 and applied to the driver 14 for driving the galvanomirror 10. Either a piezoelectric device as shown in FIG. 2a or a swing arm as shown in FIG. 2b may substitute for the galvanomirror 10.

Figure 2:
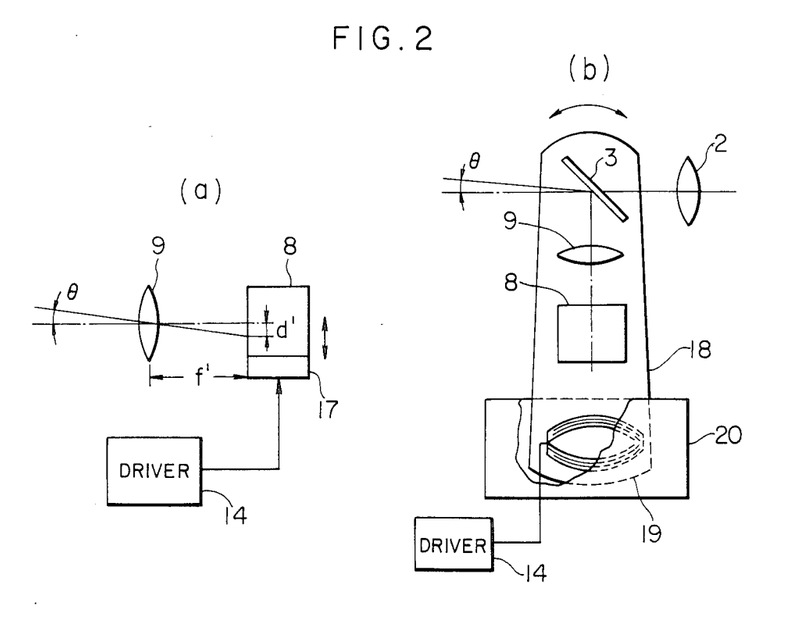
FIGS. 2a and 2b are diagrams useful in explaining modifications in the first embodiment.

In FIG. 2a, the piezoelectric device 17 is mounted to the second semiconductor laser 8, and the disc position signal such as the track information or the linear scale is used to directly move the semiconductor laser 8 by a small amount of movement in a direction along the track. By using the piezoelectric device 17 combined with a stationary mirror used in place of the galvanomirror 10, the amount of movement, d', of the semiconductor laser 8 is given by $d' = (f'/f) d$ since $\theta = d'/f' = d/f$, where f' is a focal length of the coupling lens 9, and the piezoelectric device is so controlled as to maintain this relation. In FIG. 2b, the second semiconductor laser 8 and the coupling lens 9 are carried on a swing arm 18 which is swingable about the cross point axis on the wavelength separation filter. The rotation angle $\phi'$ of the swing arm 18 is controlled such that $\phi' = \theta$ stands. The swing arm 18 comprises an electromagnetic coil 19 and a permanent magnet 20, and a control signal current is passed through the electromagnetic coil 19 to obtain a desired rotation angle.

Figure 3:
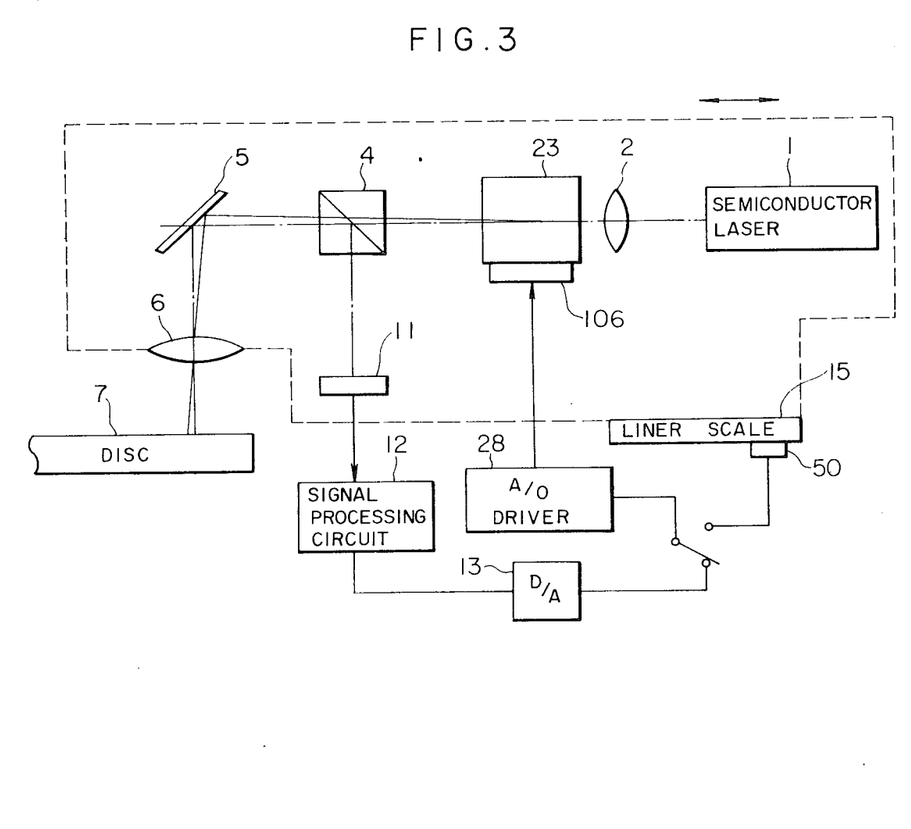
FIG. 3 is a block diagram showing an apparatus according to a second embodiment of the invention.
Figure 4:
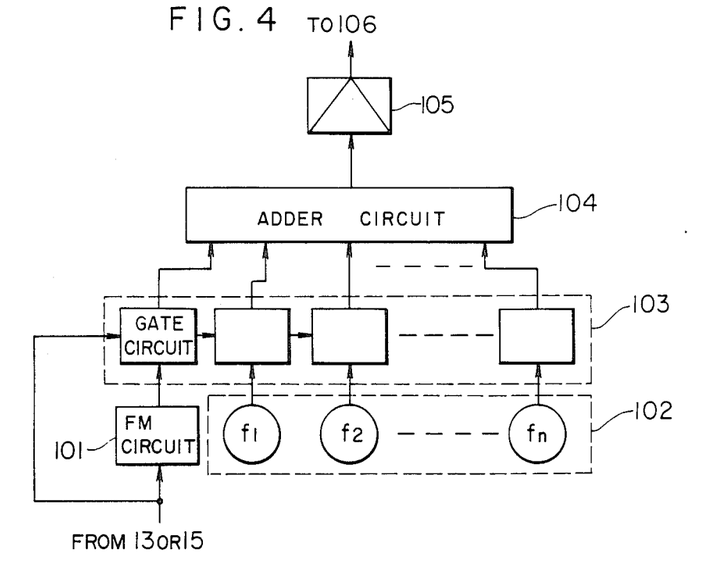
FIG. 4 is a block diagram illustrating the construction of an A/O driver.

Referring to FIG. 3, a second embodiment of the invention will now be described. In this embodiment, two spots are formed by using a single laser light source cooperative with an acousto-optic (A/O) modulator in place of the two laser light sources of the first embodiment. A light beam emitted from a laser light source 1 in the form of a semiconductor laser passes through a coupling lens 2, an A/O modulator 23, a prism 4, and a corner mirror 5 and is focused by a focusing lens 6 on the surface of a disc 7. Similar to FIG. 1, the corner mirror and the following members are illustrated after being rotated through 90° with respect to the sheet of drawing. The A/O modulator 23 is made of an acousto-optic material such as $TeO_2$ or $PbMoO_4$ through which an ultrasonic wave of a wavelength corresponding to that of a drive signal propagates, and it is responsive to the ultrasonic wave to deflect and modulate an incident beam. Since, in the A/O modulator 23, the deflection angle is in proportion to the applied frequency, a plurality of diffracted beams can be produced from the A/O modulator when the drive signal simultaneously contains a plurality of frequencies. In the error check mode in which two spots are to be formed simultaneously, two frequencies are required. For the erasing head, one write/read spot and n beams for the formation of an elliptical spot for erasing are necessary, and hence $(n+1)$ frequencies are needed. FIG. 4 shows the construction of an A/O driver 28. The light spot for write/read must be variably distant from the erase spot and it is therefore required to be movable in a desired direction along the track. To this end, an analog signal resulting from D/A conversion of track address information representative of a position of the light spot on the track or an analog signal determined by the linear scale is applied to a frequency modulation (FM) circuit 101 so as to desirably vary the oscillation frequency thereof. The erase spot, on the other hand, can be formed by adding together outputs from an oscillator circuit 102 having n oscillators of frequencies $f_1$ to $f_n$. Outputs of the FM circuit 101 and the oscillator circuit 102 are applied to a gate circuit 103 which controls the respective frequency signal magnitudes independently. The gate circuit 103 can ON-OFF control any outputs of the plurality of frequency components to select only a frequency component corresponding to a deflection angle of the light beam. In a third embodiment to be described later, the respective frequency components of an oscillator circuit 102 are selectively ON-OFF controlled to control the length of the erase beam. Signals separately delivered out of the gate circuit 103 are synthesized at an adder circuit 104. A synthesized signal containing the plurality of frequency components is amplified at an RF amplifier 105 and applied to a transducer 106 attached to the A/O modulator 23. In accordance with the circuit arrangement of FIG. 4, one light spot for write/read and the spot for erasing containing n light spots can be formed on the disc. Of course, one erase spot and another single write spot may be formed. For details of the A/O driver 28, a copending U.S. patent application Ser. No. 639,004 by some of the inventors of the present application may be referred to. As described above, the distance between the one spot and the n spots can be varied in accordance with the oscillation frequency set in the FM circuit 101.

A reflected light beam from the disc 7 passes through the focusing lens 6 and corner mirror 5 and branches at the prism 4 to a photodetector 11. The light beam is converted by the photodetector 11 into an electric signal, and a signal processing circuit 12 detects a servo signal and an information signal. Track information of the information signal is converted by a D/A converter into an analog signal which in turn is applied to the FM circuit 101 included in the A/O driver 28 to cause it to oscillate at a frequency corresponding to a disc position. Instead of the track information, an analog electric signal of a linear scale 15 may also be applied to the FM circuit 101. In the case of the error check, two beams suffice and the same effect can be attained by using the FM circuit 101 and one oscillator (for example, of $f_1$). Although, in the second embodiment, the time distance is kept constant by varying the spot distance at inner and outer peripheries, the track information and linear scale signal both indicative of the disc position may be additionally used as the control signal for the gate circuit 103 adapted to control the signal magnitude, so as to control write power and erase power at the inner and outer peripheries, thereby ensuring stable write/read/erase operations.

According to the first embodiment, the modifications therein and the second embodiment of the present invention, an optical information recording apparatus can be realized wherein when the error check and erase functions are added through the use of two spots, the track information indicative of the disc position or the linear scale for detection of the optical head position is used to make constant the time distance between the two spots, thereby preventing the data error and the displacement of erasing position due to the disturbance of timing, and in addition, the write power and erase power at the inner and outer peripheries can be controlled by using a signal indicative of the disc position so as to provide uniform and accurate data error check and data erase throughout the entire surface of the disc.

Figure 5:
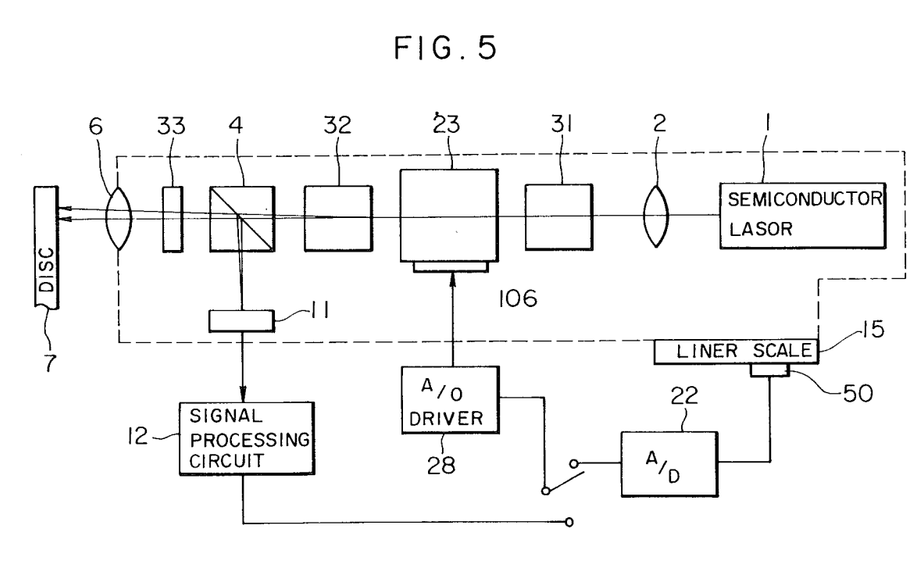
FIG. 5 is a block diagram showing an apparatus according to a third embodiment of the invention.

Referring now to FIG. 5, a third embodiment of the invention will be described. According to this embodiment, in an optical disc wherein a laser light beam is irradiated on a material to bring it into a crystalline state or an amorphous state so as to effect write/erase of information, the length of a light spot for erasing is controlled in accordance with the position on the disc. In this embodiment, a semiconductor laser is used as a laser light source.

Figure 6:
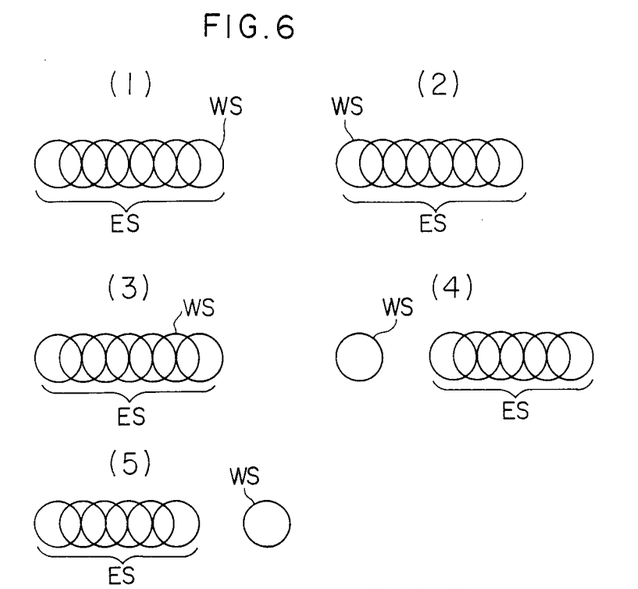
FIG. 6 is a diagrammatic representation showing different types of the positional relationship between a write/read spot WS and an erase spot ES.

A light beam emitted from a laser light source 1 is formed into parallel flux of light by means of a coupling lens 2 and passed to an A/O modulator 23. Where the light receiving area of the A/O modulator 23 is restricted, a first beam shaper 31 (a prism or a set of cylindrical lenses) is additionally used to restrict an elliptical beam emitted from the semiconductor laser in its mirror axis direction. The light beam from the A/O modulator 23 is shaped into a circular form by a second beam shaper 32 (a prism or a set of cylindrical lenses) and passes through a polarizer prism 4, a λ/4 plate 33 and a focusing lens 6 so as to be focused on the surface of a disc 7. The A/O modulator 23 is made of an acoustooptic material such as $TeO_2$ or $PbMoO_4$ through which a ultrasonic wave of a wavelength corresponding to that of a drive signal propagates, and it is responsive to the ultrasonic wave to deflect and modulate an incident beam. Since, in the A/O modulator 23, the deflection angle is in proportion to the applied frequency, a plurality of diffracted beams can be produced from the A/O modulator when the drive signal simultaneously contains a plurality of frequencies. Accordingly, the circular spot for write/read can be formed by a single diffracted beam developing under a single frequency drive, and the pseudo-elliptical spot for erasing can be formed by synthesizing a plurality of close diffracted beams developing under a drive of a plurality of close frequencies. FIG. 6 shows the positional relationship between the write/read spot WS and the erase spot ES. In FIG. 6, the close location of the respective spots WS and ES is illustrated at sections (1) to (3), and the separate location of the respective spots WS and ES is illustrated at sections (4) and (5). The various types of spot location can be materialized by suitably selecting the plurality of frequencies used. For the erasing mode, the semiconductor laser may be driven either by a pulse signal consisting of a pulse for erase having a relatively long width and a DC signal superimposed thereon which provides the same output level as that for the read mode or by a DC signal. In the former driving, when the erase pulse adversely affects the tracking error detection signal and the focusing error detection signal to causes errors in the tracking and focusing error detection signals, it is necessary that values of the tracking and focusing error signals be sample-held in the absence of the erase spot and the detection of these signals be inhibited in the presence of the erase spot. In the latter driving, the respective spots WS and ES are separated from each other as shown at sections (4) and (5) in FIG. 6 and do not mutually affect one another, and the above sample hold is therefore unnecessary.

When forming an elliptical spot by using n circular spots, the formed elliptical spot has a length l which is given by, $$l=(n-1)x+d=\{(n-1)K+1\}d$$

where d denotes a diameter of the circular spot, x a center-to-center distance between adjacent circular spots, and K a ratio as defined by x/d. On the other hand, when the erase spot having the length l is irradiated on a position at a diameter D on the disc rotating at a uniform speed of revolution N, the period of time t for the erase beam to irradiate is indicated by $t=1/(\pi DN)$. Therefore, with the length l fixed, t increases as the disc position in terms of the diameter D decreases at the inner peripheries of the disc. Thus, in order to obtain the same erase condition for the inner and outer peripheries of the disc, the number n of the circular spots for the formation of the erase spot is varied to change the length l of the erase spot by increasing or decreasing the number of the drive frequencies for the formation of the erase spot so that the period of time t for erase beam irradiation can be fixed as far as possible for a given position defined by D.

Figure 7:
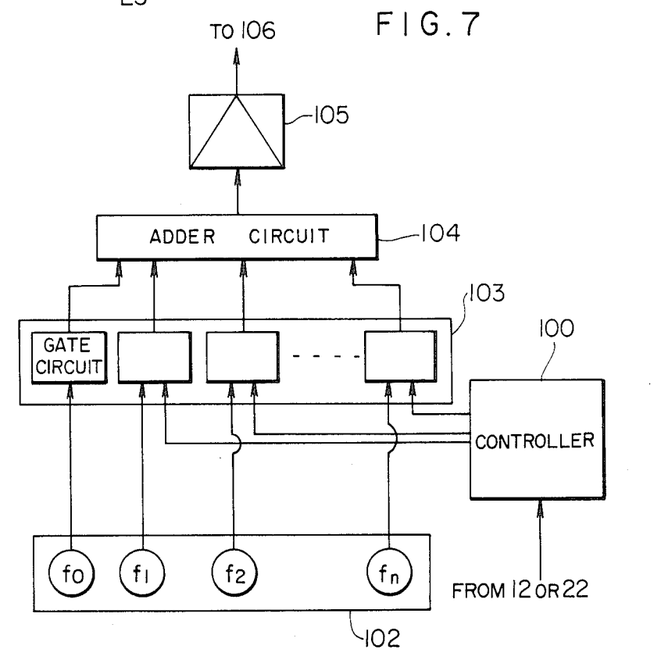
FIG. 7 is a block diagram of a drive circuit for A/O modulator.

FIG. 7 shows details of an A/O driver 28 used in FIG. 5. The A/O 28 comprises an oscillation circuit 102 including an oscillator having a frequency to for the write/read beam and n oscillators having frequencies $f_1$ to $f_n$ for the erase beam, a controller 100 for controlling the length of the erase spot, a gate circuit 103 which ON-OFF controls outputs of the oscillation circuit 101 or controls the magnitude thereof, an adder circuit 104 for adding together the (n+1) output signals, and an RF amplifier 105 for amplifying a synthesized signal. The synthesized signal is applied to a transducer 106 attached to the A/O modulator 23, thus forming the circular spot for write/read based on the single beam and the elliptical spot for erase based on the n beams.

Flux of light reflected from the disc 7 passes through the focusing lens 6 and λ/4 plate 33 and it is deflected at the polarizer prism 4 toward a photodetector 11 to impinge thereon. The photodetector 11 converts the flux of light into an electric signal, and a signal processing circuit 12 detects a servo signal and an information signal. Track information of the information signal is applied to the controller 100 to turn ON a number of oscillators corresponding to a disc position.

Figure 8:
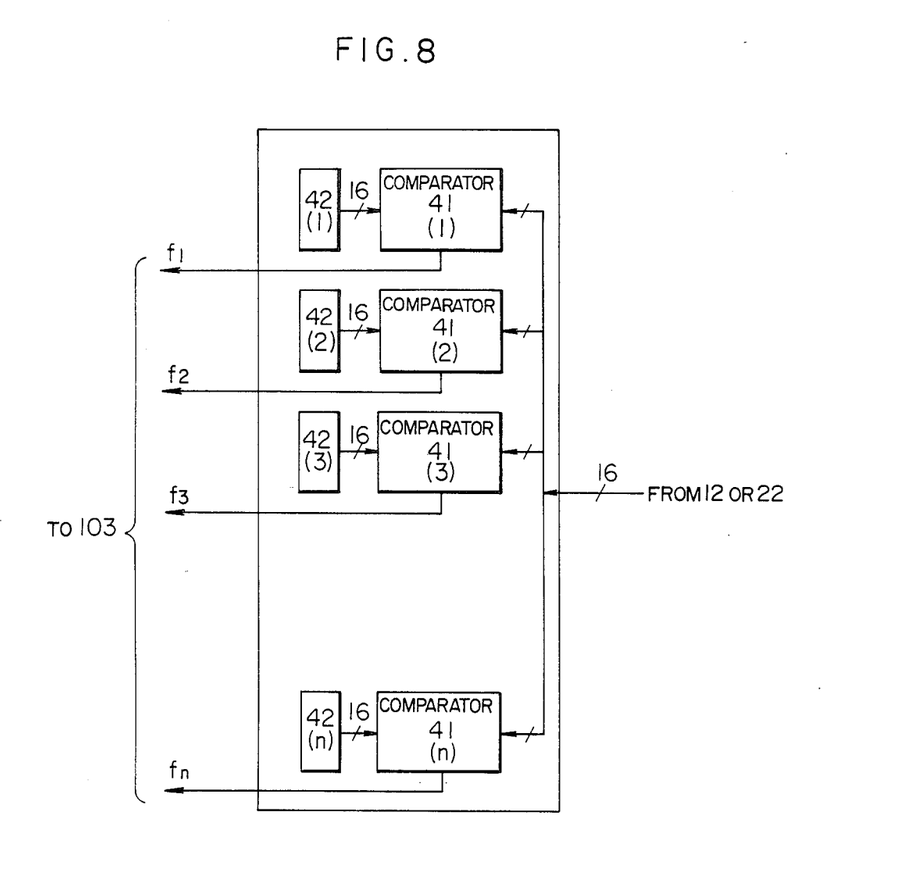
FIG. 8 is a block diagram of a controller for controlling the erase spot.

As shown in FIG. 8, the controller for the erase spot comprises n comparators 41(1) to 41(n), and initial level setting circuits 42(1) to 42(n) associated with the respective comparators. A digital signal of, for example, 16 bits obtained as a track address is fed to each of the comparators. The comparator set in advance with an initial level of 16-bit digital information compares the initial level with the track address and produces, when both the inputs to the comparator satisfies a condition such as initial level C≦track address T, C<T, C>T or C≧T, a signal which turns ON a corresponding oscillator or corresponding oscillators. Accordingly, by suitably setting the initial level, a desired number of the oscillators of frequencies $f_1$ to $f_n$ can be turned ON in response to the input track address. The illustrated circuit includes combined logic circuits which provide the output in one-to-one correspondence relationship to the input and therefore, this circuit may otherwise be materialized readily by utilizing a P-ROM, for example. Where the linear scale for the optical head is used, an electric signal from the linear scale is converted by an A/D converter 22 into a 16-bit digital signal which in turn is applied as a signal corresponding to the track address to the controller 100, thus attaining the same effect.

For example, let us consider that a disc having a recording area defined by the outermost periphery of a diameter 200 mm and the innermost periphery of a diameter 100 mm rotates at a revolution of 1200 rpm. If the characteristic of the recording film requires a period of time for erase beam irradiation of 1μsec, then the erase spot lengths at the outermost and innermost peripheries must be 12.6 μm and 6.28 μm, respectively. If a laser beam having a spot diameter d of 1.66 μm is used on the assumption that K=½, then the above spot lengths can be realized by 14 spots at the outermost periphery of the disc and by 7 spots at the innermost periphery. In this case, 8-step spot lengths ranging from 7 to 14 spots can be obtained. When the 8 steps are to be switched by the track address information, the total number of tracks of the above examplified disc amounts to 31250 for a track pitch being 1.6 μm, and the disc position, track address and spot number are mutually related as indicated in Table 1. In this case, the initial levels as indicated in Table 2 are used for the controller. If the comparator is so set as to produce the signal for turning ON the oscillator when the track address exceeds the initial level, then for a track address of $(12000)_{10}$, for example, 10 oscillators of frequencies $f_1$ to $f_{10}$ will be turned ON.

TABLE 1

Relation Between Disc Position, Track Address and Spot Number

| Disk position (mmØ) | Track address | Spot number |
|---|---|---|
| 100 ~ 112.5 | 0 ~ 3906 | 7 |
| 112.5 ~ 125 | 3907 ~ 7813 | 8 |
| 125 ~ 137.5 | 7814 ~ 11719 | 9 |
| 137.5 ~ 150 | 11720 ~ 15625 | 10 |
| 150 ~ 162.5 | 15626 ~ 19531 | 11 |
| 162.5 ~ 175 | 19532 ~ 23438 | 12 |
| 157 ~ 187.5 | 23439 ~ 27344 | 13 |
| 187.5 ~ 200 | 27345 ~ 31249 | 14 |

TABLE 2

Initial Levels Used for Controller

| Frequency | 10-nary | 16-nary | Binary (16 bits) |
|---|---|---|---|
| $f_1$ | 0 | 0000 | 0000000000000000 |
| $f_2$ | 0 | 0000 | 0000000000000000 |
| $f_3$ | 0 | 0000 | 0000000000000000 |
| $f_4$ | 0 | 0000 | 0000000000000000 |
| $f_5$ | 0 | 0000 | 0000000000000000 |
| $f_6$ | 0 | 0000 | 0000000000000000 |
| $f_7$ | 0 | 0000 | 0000000000000000 |
| $f_8$ | 3907 | 0F43 | 0000111101000011 |
| $f_9$ | 7814 | 1E86 | 0001111010000110 |
| $f_{10}$ | 11720 | 2DC8 | 0010110111001000 |
| $f_{11}$ | 15626 | 3D0A | 0011110100001010 |
| $f_{12}$ | 19532 | 4C4C | 0100110001001100 |
| $f_{13}$ | 23439 | 568F | 0101011010001111 |
| $f_{14}$ | 27345 | 6AD1 | 0110101011010001 |

According to the third embodiment of the invention, when the elliptical erase spot is to be formed by the optical head utilizing the A/O modulator, the track information indicative of the disc position or the linear scale indicative of the optical head position is used to vary the length of the erase spot so as to make constant the erase beam irradiation time period at the inner and outer peripheries of the disc and consequently realize the same erase condition for the inner and outer peripheries. In accordance with teachings of the invention, the erase beam power on the disc surface may also be varied by varying the laser output power or by varying the output of the oscillation circuit 102 by means of the gate circuit 103. Incidentally, like the second embodiment wherein the distance between the write/read light spot and the erase spot is variable depending on their positions, the distance between the write/read spot and the erase spot may obviously be controlled simultaneously with the variation of the erase spot length in the third embodiment.

We claim:

1. An optical information recording apparatus comprising:
   means for generating a plurality of light beams;
   optical means for focusing the plurality of light beams on a track of a predetermined disc so as to irradiate a plurality of light spots on different positions along the track;
   means for varying the center position of at least one of said plurality of light spots in a direction along said track;
   means for detecting the position of said at least one of said plurality of light spots in the radial direction of said disc; and
   means responsive to the output signal from said position detecting means, for controlling said varying means.

2. An optical information recording apparatus according to claim 1 wherein said plural light beam generating means comprises a plurality of laser light sources.

3. An optical information recording apparatus according to claim 2 wherein said plural light spot position varying means comprises a galvanomirror placed in an optical path of at least one of said plurality of light beams, and the galvanomirror is driven on the basis of the output from said position detecting means to control the distance between said plurality of light spots.

4. An optical information recording apparatus according to claim 2 wherein said plural light spot position varying means comprises a piezoelectric device attached to at least one of said plurality of laser light sources, and the electric field applied to the piezoelectric device is controlled on the basis of the output of said position detecting means to control the distance between said plurality of light spots.

5. An optical information recording apparatus according to claim 2 wherein said plural light spot position varying means comprises swing arm means carrying at least one of said plurality of laser light sources, and current passed through an electromagnetic coil of said swing arm means is varied on the basis of the output of said position detecting means to control the distance between said plurality of light spots.

6. An optical information recording apparatus according to claim 1 wherein said position detecting means comprises a photodetector for reception and conversion of a light beam reflected from the surface of said disc into an electric signal which provides track address information.

7. An optical information recording apparatus according to claim 1 wherein said position detecting means comprises a linear scale which detects the position of said optical information recording apparatus on said disc.

8. An optical information recording apparatus according to claim 1 wherein said plural light beam generating means comprises an acousto-optic modulator applied with an ultrasonic wave containing a plurality of frequencies, and a single light beam emitted from a single laser light source is passed through said acousto-optic modulator.

9. An optical information recording apparatus according to claim 8 wherein said acousto-optic modulator also acts as said plural light spot position varying means, said acousto-optic modulator being responsive to the output of control means therefor to control the distance between said plurality of light spots, said control means including a plurality of oscillator means for independent generation of a plurality of frequency signals, and means responsive to the output signal of said position detecting means for modulating and adding together the respective outputs of said oscillator means.

10. An optical information recording apparatus according to claim 9 wherein at least one of said plurality of oscillator means comprises an FM circuit which is responsive to the output of said position detecting means to produce a desired frequency signal.

11. An optical information recording apparatus according to claim 10 wherein said modulating means comprises a gate circuit which is responsive to the output of said position detecting means to independently turn ON or OFF the respective outputs of said oscillator means.

12. An optical information recording apparatus comprising:
an acousto-optic modulator applied with a plurality of ultrasonic wave frequencies for generating from a single light beam emitted from a single laser light source a plurality of light beams for irradiation of a plurality of light spots on a track of a disc and for varying the center position of at least one of said plurality of light spots in a direction along said track;
optical means for focusing said plurality of light beams on said track so as to irradiate said plurality of light spots on different positions along said track;
means for detecting the position of said at least one of said plurality of light spots in the radial direction of said disc; and
means responsive to the output signal of said position detecting means for varying the ultrasonic frequencies applied to said acousto-optic modulator so as to control the center position of said at least one of said plurality of light spots.

13. An optical information recording apparatus according to claim 12 wherein said light spot center position controlling means comprises oscillator means for independent generation of a plurality of frequency signals, and means responsive to the output signal of said position detecting means for modulating and adding together the respective outputs of said oscillator means, whereby the number of the frequency signals applied to said acousto-optic modulator is varied to vary the length of said light spot to thereby control the center position of said light spot.

14. An optical information recording apparatus according to claim 13 wherein said modulating means comprises means for comparing the output signal of said position detecting means with an initial level, the output of said comparing means being used to turn ON or OFF the respective outputs of said oscillator means.

15. An optical information recording apparatus according to claim 13 wherein said position detecting means comprises a photodetector for reception and conversion of a light beam reflected from the surface of said disc into an electric signal which provides track address information.

16. An optical information recording apparatus according to claim 13 wherein said position detecting means comprises a linear scale which detects the position of said information recording apparatus on said disc.

* * * * *